Aug. 12, 1930.   R. D. EVANS ET AL   1,772,480
TRANSMISSION SYSTEM
Filed March 15, 1923
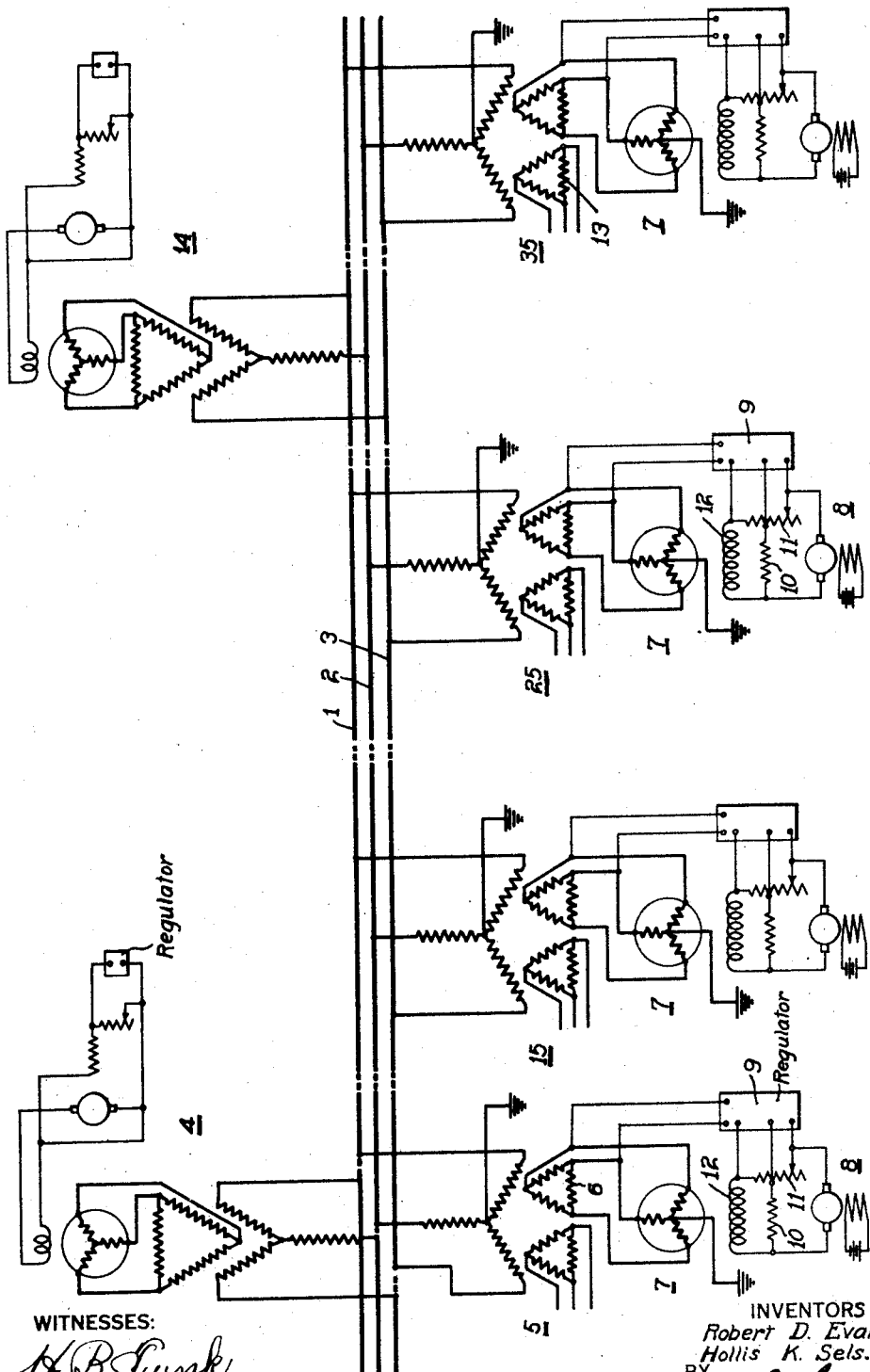
WITNESSES:
H. B. Funk
W. R. Coley
INVENTORS
Robert D. Evans &
Hollis K. Sels.
BY
Wesley G. Carr
ATTORNEY.

Patented Aug. 12, 1930

1,772,480

UNITED STATES PATENT OFFICE

ROBERT D. EVANS AND HOLLIS K. SELS, OF PITTSBURGH, PENNSYLVANIA, ASSIGNORS TO WESTINGHOUSE ELECTRIC AND MANUFACTURING COMPANY, A CORPORATION OF PENNSYLVANIA

TRANSMISSION SYSTEM

Application filed March 15, 1923. Serial No. 625,282.

Our invention relates to electrical power transmission lines or systems, and particularly to those for the transmission of power at high voltages over long distances.

In a copending application of Frank G. Baum, Serial No. 569,704, filed June 20, 1922, patented Feb. 8, 1927, No. 1,617,007, is shown a system that is particularly adapted to high-voltage long-distance transmission of electrical power, this system embodying a plurality of synchronous condensers substantially equally spaced along the line and adapted to provide the wattless current required in each section of the line between condenser stations, whereby a substantially constant voltage may be maintained throughout a relatively long transmission line.

One object of our invention is to provide a transmission system of this general type wherein the sections are made unequal in length or are given characteristics equivalent to such unequal lengths in order to increase the economy of installation and operation of the system in certain cases.

Another object of our invention is to provide a transmission system of the class just described, wherein corrective loading devices, such as synchronous condensers, are adapted to supply leading or lagging currents to the line at a plurality of points that are spaced in accordance with the amount of power required or the equivalent along the line between a supply and a load point.

Other objects of our invention will become evident from the following detailed description taken in conjunction with the accompanying drawing, wherein the single figure is a diagrammatic view of a transmission and distribution system organized in accordance with our present invention.

In some cases, the overall economy of the transmission system may be increased without reaching or exceeding the possible regulation or power limits thereof by making the sections successively greater in length as the distance from the source of energy, such as a hydro-electric generating station, increases. In general, the number of sections should be as small as possible to permit the necessary transmission of power along the line. The smaller the number of sections, the lower will be the maintenance and operating costs, as well as the cost of sub-stations, etc. Furthermore, in this way the ratio of actual power transmitted in each section to the maximum amount possible to be transmitted remains substantially constant.

Referring to the drawing, the system here shown comprises a relatively high-voltage and long-distance transmission lines, preferably of the three-phase type, embodying conductors 1, 2 and 3, which may be supplied at various points from suitable steam or hydraulically driven generating stations that are regulated for constant voltage, two of which are indicated at 4 and 14, respectively.

At points spaced along the system substantially in accordance with the distance from the one main generating station 4, or in accordance with the relative distances from successive generating stations, a plurality of synchronous condenser sub-stations 5, 15, 25 and 35 are connected across the line. Thus power may be fed in either direction by any generating station.

Considering the spacing between sub-stations, that is, the section lengths, in detail, the sections will gradually increase in length as the distance from the generating station increases, in the case where a single generating station is employed.

In the case of two or more sources of power being connected to the transmission line, the section lengths will vary in accordance with the relative distances from successive generating stations, that is, the sections nearest to each source will be of shorter length than the more remote sections. The longest section of line will thus be midway between successive generating stations, if they are of substantially equal capacity. If of unequal capacity, the proper ratios may be readily computed in accordance with the principles set forth above.

Viewed from another angle, the spacing of the several substations is such that, for a given voltage the ratio of actual power transmitted in each section of the line to the maximum amount of power that may be transmitted over the corresponding section is substantially constant for all sections of the line.

Each sub-station may comprise a suitable step-down transformer 5 having the neutral point of its primary winding grounded for stabilization purposes, as will be understood; a synchronous condenser 7, which is connected through a secondary winding 6 of the transformer 5 to the transmission line; and exciter 8 and a regulator 9 for automatically regulating the operation of the corresponding synchronous condenser in accordance with the demands of the transmission line.

The exciter 8 is connected through a suitable variable resistor 11 to the exciting field winding 12 of the synchronous condenser 7, while a suitable regulator, conventionally illustrated at 9, is shown as being responsive to the voltage across one phase of the synchronous condenser for so controlling the series resistor 11 and a second resistor 10 that is connected in parallel relation to the field winding 12, as to automatically over-excite or under-excite the field winding to maintain the desired constant voltage under all conditions upon the transmission line.

The particular type of regulator to be employed is not relevant to the present invention, and any suitable regulator for automatically over-exciting and under-exciting the field winding 12 as desired, may be employed.

As examples of such a regulator, reference may be had to Tirrill patent #1,192,708, which was granted July 25, 1916, and to a copending application of H. A. Travers, Regulator systems, Serial No. 540,178, filed March 1, 1922, and assigned to the Westinghouse Electric & Manufacturing Company.

As indicated upon the drawing, the sub-station 25 is spaced a greater distance from the sub-station 15 than the latter is spaced from the first sub-station 5. Sub-station 25 and sub-station 35 may be spaced substantially equal distances on opposite sides of generating station 14. The distance between successive sub-stations is selected in the manner previously described, and in this way a relatively economical system of high-voltage transmission for long distances is provided.

We desire to point out that a system constructed in accordance with our invention will tend to be more stable than a system employing substantially equal spacing of synchronous condensers, under emergency conditions such as short-circuits, grounds, etc., when the load approaches the point of instability. In this event, the section of the line furthest from a generating station, that is, the longest section will tend to become unstable at least as soon as the nearest section, or in fact, the spacing may be chosen such that furthest removed section will become unstable first.

On the other hand, with equal spacing of sections, the nearest section, because of its greater normal load, tends to become unstable first. Thus our invention tends toward better stability of the system as a whole, since the maximum possible length of line is maintained stable even under emergency conditions.

If it is desired to secure certain advantages of our invention while employing substantially equally spaced sub-stations, this result may be effected by the proper arrangement of sizes of conductors in the respective sections. In this way, different electrical characteristics may be secured to permit the desired ratio of actual power transmitted to maximum power possible, with respect to each section.

We do not wish to be restricted to the specific circuit connections or arrangement of parts herein set forth, as various modifications thereof may be made within the spirit and scope of our invention. We desire, therefore, that only such limitations shall be imposed as are indicated in the appended claims.

We claim as our invention:

1. A relatively long, relatively high-voltage transmission line comprising a source of energy, a load point and a plurality of synchronous condensers connected across the line at points so spaced that at a given load the ratio of actual power transmitted to the maximum amount of power possible to be transmitted in the corresponding section is substantially constant.

2. A long-distance high-voltage power-transmission system comprising: a line connected to power-supply and load circuits and extended beyond the normally inherent stability limits of distance for such a line so connected; and wattless-current generating means intercepting said line within said stability limits and having such rating and regulation as to be adequate to carry the charging current and control the voltage along the line itself and to maintain the stability of the system for through power-transmission along the line from no load to peak load, such line-regulation for through transmission being dominant over whatever local regulation is employed in power-supply or load circuits on the line, the sections into which the line is divided by said intercepting wattless-current generating means being of dissimilar lengths and the margin of stability in each section being substantially the same.

3. A long-distance high-voltage power-transmission system comprising: a line connected to power-supply and load circuits and extended beyond the normally inherent stability limits of distance for such a line so connected; and a synchronous condenser or synchronous condensers intercepting said line within said stability limits and having such rating and regulation as to be adequate to carry the charging current and control the voltage along the line itself and to maintain the stability of the system for through power-transmission along the line from no load to peak load, such line-regulation for through transmission being dominant over whatever local regulation is employed in power-supply or load circuits on the line, the power and load circuits being such that the normal or expected power actually transmitted is materially different in different sections of the line between different pairs of substations, and the line constants of the said sections being such that the power actually carried under normal or expected conditions in each of the said sections is a predetermined constant proportion of the maximum amount possible to be transmitted under emergency conditions.

In testimony whereof, we have hereunto subscribed our names this 7th day of March, 1923, and this 27th day of February, 1923, respectively.

ROBERT D. EVANS.
HOLLIS K. SELS.